United States Patent
Park et al.

(10) Patent No.: US 10,618,386 B2
(45) Date of Patent: Apr. 14, 2020

(54) ELECTRIC SUNSHADE AND SUNROOF STRUCTURE

(71) Applicants: Hyundai Motor Company, Seoul (KR); Kia Motors Corporation, Seoul (KR); Webasto Donghee Holdings, Ulsan (KR)

(72) Inventors: Jeong Hoon Park, Suwon-si (KR); Seong Min Gwak, Busan (KR); Su Yun Choi, Ulsan (KR)

(73) Assignees: Hyundai Motor Company, Seoul (KR); Kia Motors Corporation, Seoul (KR); Webasto Donghee Holdings, Ulsan (KR)

( * ) Notice: Subject to any disclaimer, the term of this patent is extended or adjusted under 35 U.S.C. 154(b) by 113 days.

(21) Appl. No.: 15/851,392

(22) Filed: Dec. 21, 2017

(65) Prior Publication Data

US 2018/0313124 A1   Nov. 1, 2018

(30) Foreign Application Priority Data

Apr. 28, 2017 (KR) .................... 10-2017-0055084

(51) Int. Cl.
| | | |
|---|---|---|
| *B60J 3/02* | (2006.01) | |
| *B60J 7/043* | (2006.01) | |
| *B60J 7/057* | (2006.01) | |
| *B60J 7/00* | (2006.01) | |
| *E05D 15/10* | (2006.01) | |
| *E05D 15/58* | (2006.01) | |
| *E05F 15/60* | (2015.01) | |
| *B60J 7/02* | (2006.01) | |
| *E05F 17/00* | (2006.01) | |

(Continued)

(52) U.S. Cl.
CPC ............ *B60J 7/0007* (2013.01); *B60J 7/022* (2013.01); *B60J 7/0435* (2013.01); *B60J 7/0573* (2013.01); *E05D 15/101* (2013.01); *E05D 15/58* (2013.01); *E05F 15/60* (2015.01); *E05F 15/643* (2015.01); *E05F 15/646* (2015.01); *E05F 17/002* (2013.01); *E05Y 2201/484* (2013.01); *E05Y 2400/415* (2013.01); *E05Y 2900/542* (2013.01)

(58) Field of Classification Search
CPC ........ B60J 7/0435; B60J 7/0007; B60J 7/057; B60J 7/0573
USPC ................... 296/216.02–216.05, 223, 214
See application file for complete search history.

(56) References Cited

U.S. PATENT DOCUMENTS

| | | | | |
|---|---|---|---|---|
| 8,814,257 B2 * | 8/2014 | Sugimoto | .............. | B60J 7/0573 296/214 |
| 8,825,288 B2 * | 9/2014 | Nagase | .................. | B60J 3/0204 296/214 |

FOREIGN PATENT DOCUMENTS

KR    10-2006-0055080 A    5/2006

* cited by examiner

*Primary Examiner* — Dennis H Pedder
(74) *Attorney, Agent, or Firm* — Morgan, Lewis & Bockius LLP

(57) ABSTRACT

An electric sunshade and sunroof structure may include cable assembly connected to a drive motor via a cable, sliding longitudinally along each of guide slide assemblies disposed on rails provided on both sides of a roof panel of a vehicle, thus opening or closing a sunshade, and moving integrally with the guide slide assembly to open a sunroof glass, a sunshade guide lever provided on the sunshade and selectively coupled with the cable assembly to move the sunshade, and a guide slide lever provided on a rear end (Continued)

portion of the guide slide assembly and selectively coupled with the cable assembly to move the sunroof glass.

10 Claims, 10 Drawing Sheets

(51) Int. Cl.
    *E05F 15/646*     (2015.01)
    *E05F 15/643*     (2015.01)

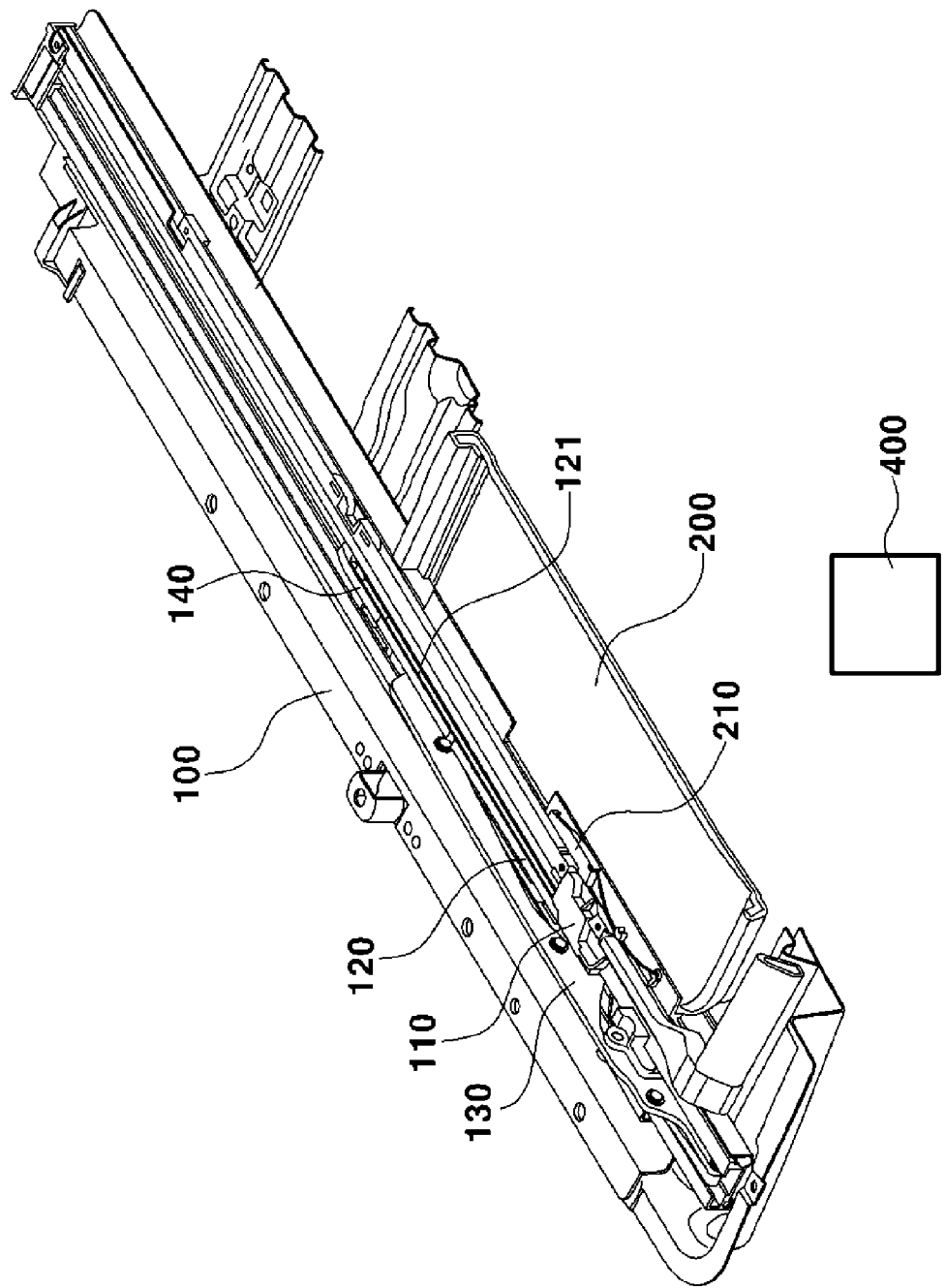

ELECTRIC SUNSHADE AND SUNROOF STRUCTURE

CROSS-REFERENCE TO RELATED APPLICATIONS

The present application claims priority to Korean Patent Application No. 10-2017-0055084, filed Apr. 28, 2017, the entire content of which is incorporated herein for all purposes by this reference.

BACKGROUND OF THE INVENTION

Field of the Invention

The present invention relates to an electric sunshade and sunroof structure of a vehicle. More particularly, the present invention relates to a sunroof structure capable of integrally opening or closing a sunshade and a sunroof glass using a single drive motor, and to an electric sunshade and sunroof structure configured for sequentially opening or closing a sunshade and an external sunroof through a single motor.

Description of Related Art

An opening may be formed on a roof panel (ceiling) of a vehicle to discharge air out from the vehicle or introduce external air into the vehicle. A sunroof glass is generally installed in the opening to be opened or closed.

That is, various frames including a mechanism rail are provided on the roof panel, and the sunroof glass is tilted upwards and downwards or slides forwards and backwards on the frame.

Recently, for providing an expansive feeling and a good appearance, a panorama sunroof is widely used, wherein a large portion of the roof panel includes the sunroof glass and a portion of the roof panel is selectively opened or closed. Accordingly, a driver may be exposed to more sunlight through the panorama sunroof.

Meanwhile, the sunroof glass includes a transmission material. Thus, to prevent sunlight from being directly transmitted to an internal of the vehicle, the sunshade is provided on a bottom portion of the sunroof glass to be slidable forwards and backwards thereof.

The sunshade is used for several purposes, that is, prevents the internal temperature of the vehicle from rising or shields a driver's eyes against glare. The sunshade is configured to be opened or closed if desired.

However, the conventional sunroof is problematic in that the sunroof glass and the sunshade are configured to slide forwards and backwards by two different drive motors, respectively, thus causing an increase in production cost of the vehicle as well as weight of a vehicle body.

Furthermore, this is problematic in that the depth of a head lining is excessively increased to install the two drive motors, so that a space for a rear headroom is undesirably reduced.

Conventionally, there has been used an operating method in which only the sunroof glass is operated by a single drive motor and the sunshade slides manually. However, the method is also problematic in that it is inconvenient.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a sunroof structure configured for integrally operating a sunshade and an external sunroof glass using a single motor.

Various aspects of the present invention are directed to providing a sunroof structure including a cable assembly on a rail to be sequentially coupled with a sunshade guide lever and a guide slide lever.

Objects of the present invention are not limited to the above-mentioned objects, and other objects that are not mentioned herein will be clearly understood by those skilled in the art from the following description of embodiments. Furthermore, the objects of the present invention may be accomplished by claims and a combination thereof.

To accomplish the above objects of the present invention, an electric sunshade and sunroof structure has the following configuration.

Various aspects of the present invention are directed to providing an electric sunshade and sunroof structure including a cable assembly connected to a drive motor via a cable, sliding longitudinally along each of guide slide assemblies disposed on rails provided on both sides of a roof panel of a vehicle, thus opening or closing a sunshade, and moving integrally with the guide slide assembly to open a sunroof glass; a sunshade guide lever provided on the sunshade, and selectively coupled with the cable assembly to move the sunshade; and a guide slide lever provided on a rear end portion of the guide slide assembly, and selectively coupled with the cable assembly to move the sunroof glass, wherein the cable assembly is fastened to the sunshade guide lever to open the sunshade, and is released from the sunshade guide lever and then is fastened to the guide slide lever to open the sunroof glass.

The electric sunshade and sunroof structure may further include a tilt lever provided on each of opposite end portions of the sunroof glass, and including a tilt groove to be movable up and down; and a tilt protrusion moving integrally with the guide slide lever to be movable along the tilt groove, wherein, when the guide slide lever may move to a rear of the vehicle, the tilt protrusion may move the tilt lever upwards, thus tilting up the sunroof glass.

The guide slide lever may include at an end portion thereof an insertion portion, and the insertion portion may be fixedly inserted into the rail until the insertion portion may be fastened to the cable assembly.

The electric sunshade and sunroof structure may further include a guide slide elastic member connected to the guide slide lever and providing a predetermined tension in a direction where the guide slide lever is fixed.

The electric sunshade and sunroof structure may further include a sunshade guide portion provided on the sunshade guide lever to release the sunshade guide lever from the cable assembly.

The electric sunshade and sunroof structure may further include a sunshade elastic member connected to the sunshade guide lever and providing a predetermined tension in a direction where it is coupled with the cable assembly.

A protrusion provided on the sunshade guide lever may move along a groove provided on the cable assembly to release the sunshade guide lever from the cable assembly.

The cable assembly may be configured to move along a groove provided on a side of the guide slide assembly.

After the cable assembly may be moved to close the sunroof glass, the cable assembly may be moved to close the sunshade.

The cable assembly may move the guide slide lever to a front of the vehicle to close the sunroof glass, and, after the cable assembly may be released from the guide slide lever, the cable assembly may be fastened to the sunshade guide lever and move along the guide slide assembly to close the sunshade.

The present invention may achieve the following effects by the configuration, coupling, and use of the above-described embodiments.

Various aspects of the present invention are directed to providing an electric sunshade and sunroof structure configured for moving a sunshade and a sunroof glass via a single motor, thus providing convenience to a user.

Furthermore, various aspects of the present invention are directed to providing an electric sunshade and sunroof structure having a single motor, thus providing a larger space for a head lining.

Various aspects of the present invention are directed to providing a device configured for opening or closing a sunshade and a sunroof glass having a single motor, thus enhancing economic efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 2A and 2B are views illustrating an operation for opening a sunshade of an electric sunshade and sunroof structure according to an exemplary embodiment of the present invention;

Figure 1:
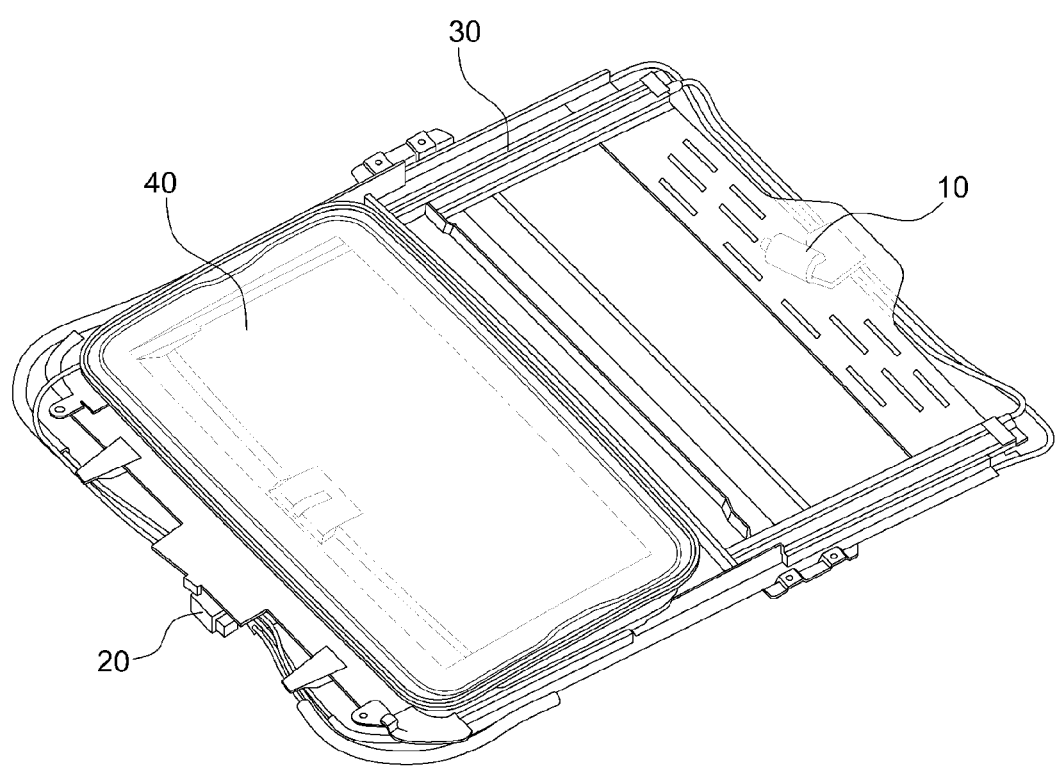
FIG. 1 is a view illustrating a conventional sunroof structure for opening a sunshade and a sunroof glass through two motors.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Furthermore, terms "part", "assembly", etc. described herein mean devices for processing at least one function or operation, which may be implemented by hardware, software, or a combination of hardware and software.

Various aspects of the present invention are directed to providing an electric sunshade and sunroof structure, which is configured to sequentially open or close a sunshade 200 and a sunroof glass 300 via a single drive motor 400 and a cable.

To open the sunshade 200 and the external sunroof glass 300 through the single drive motor 400, a cable assembly 110 connected to the drive motor 400 via the cable is included. The cable assembly 110 is configured to move along internal grooves 121 of guide slide assemblies 120 disposed on rails 100 provided on both sides of a roof panel of a vehicle, and to move simultaneously with the guide slide assemblies 120 by moving guide slide levers 140 located at end portions of the guide slide assemblies 120. The guide slide assembly 120 is configured to move on rails while a protrusion of the cable assembly 110 is configured to move along the internal grooves 121 of the guide slide assembly. The guide slide assembly 120 further includes a guide slide 140 which is hinged to the end of the guide slide assembly 120, thus allowing the movement therefrom in a height direction. The groove 121 is longitudinally formed in each guide slide assembly 120 and extended to the guide slide lever 140.

When the cable assembly 110 moves along the groove 121 located in the guide slide assembly 120, it is coupled and moved with a sunshade guide lever 210 fixedly provided on the sunshade 200, thus moving the sunshade 200 to the front and rear of the vehicle.

Furthermore, the guide slide assembly 120 is configured to be fixed to the sunroof glass 300. Thus, when the guide slide assembly 120 is moved by the cable assembly 110, the sunroof glass 300 is opened.

That is, the present invention is configured to open or close the sunshade 200 through the cable assembly 110 moving along the internal groove 121 of the guide slide assembly 120, and to move the guide slide assembly 120, coupled with the guide slide lever 140 located at one end portion of the guide slide assembly 120, to the front and rear of the vehicle, thus opening or closing the sunroof glass 300.

Figure 2B:
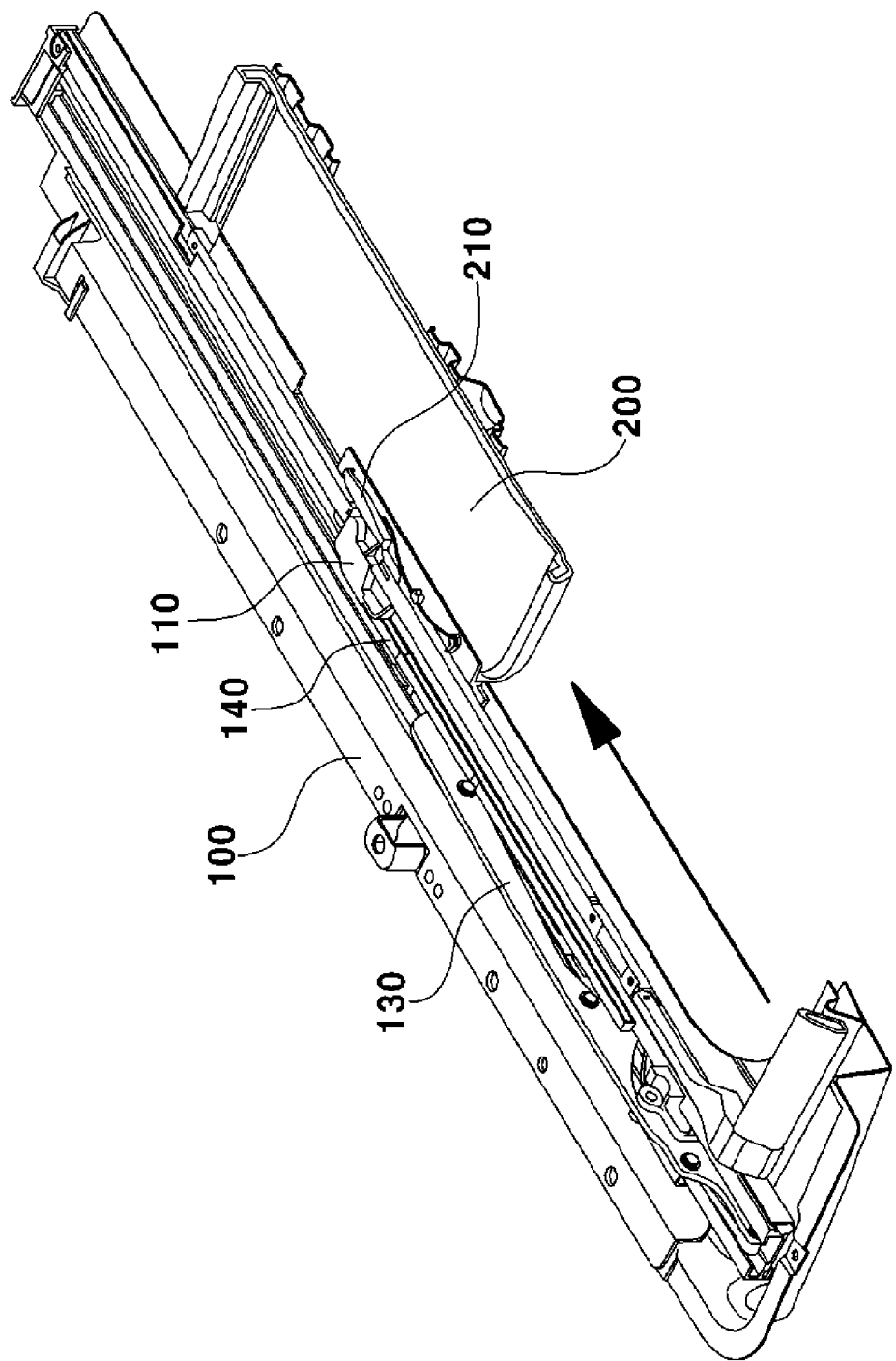

FIGS. 2A and 2B illustrate a side of the roof panel of the vehicle according to an exemplary embodiment of the present invention.

As illustrated in FIGS. 2A and 2B, the guide slide assemblies 120 are disposed on the rails 100 provided on both sides of the roof panel, and the groove 121 is longitudinally formed in each guide slide assembly 120.

In the state where the sunroof glass 300 and the sunshade 200 are closed, the cable assembly 110 is coupled with the sunshade guide lever 210. In the state where the sunshade guide lever 210 is coupled with the cable assembly 110, the cable assembly 110 moves to the rear of the vehicle along the internal groove 121 of the guide slide assembly 120. In one exemplary embodiment of the present invention, the sunshade guide lever 210 is coupled with the cable assembly which moves along the guide slide assembly 120 so that the protrusion 212 of the sunshade guide lever 210 moves inside the groove 111 formed in the cable assembly 110. The groove 110 is configured such that one end toward the front of the vehicle is open and the other end is closed with a predetermined curvature in the inward direction of the vehicle. The protrusion 212 of the guide lever 210 is inserted along the groove 111 to be located at the closed end with a predetermined curvature so that the cable assembly 110 and the guide lever 210 integrally moved to the rear of the vehicle.

The groove 121 of the guide slide assembly 120 may be formed integrally with the groove of the guide slide lever 140 located at a rear end portion of the guide slide assembly 120. The cable assembly 110 moves along the groove 121 of the guide slide assembly 120 until it is coupled with the guide slide lever 140, thus opening the sunshade 200.

Figure 3A:
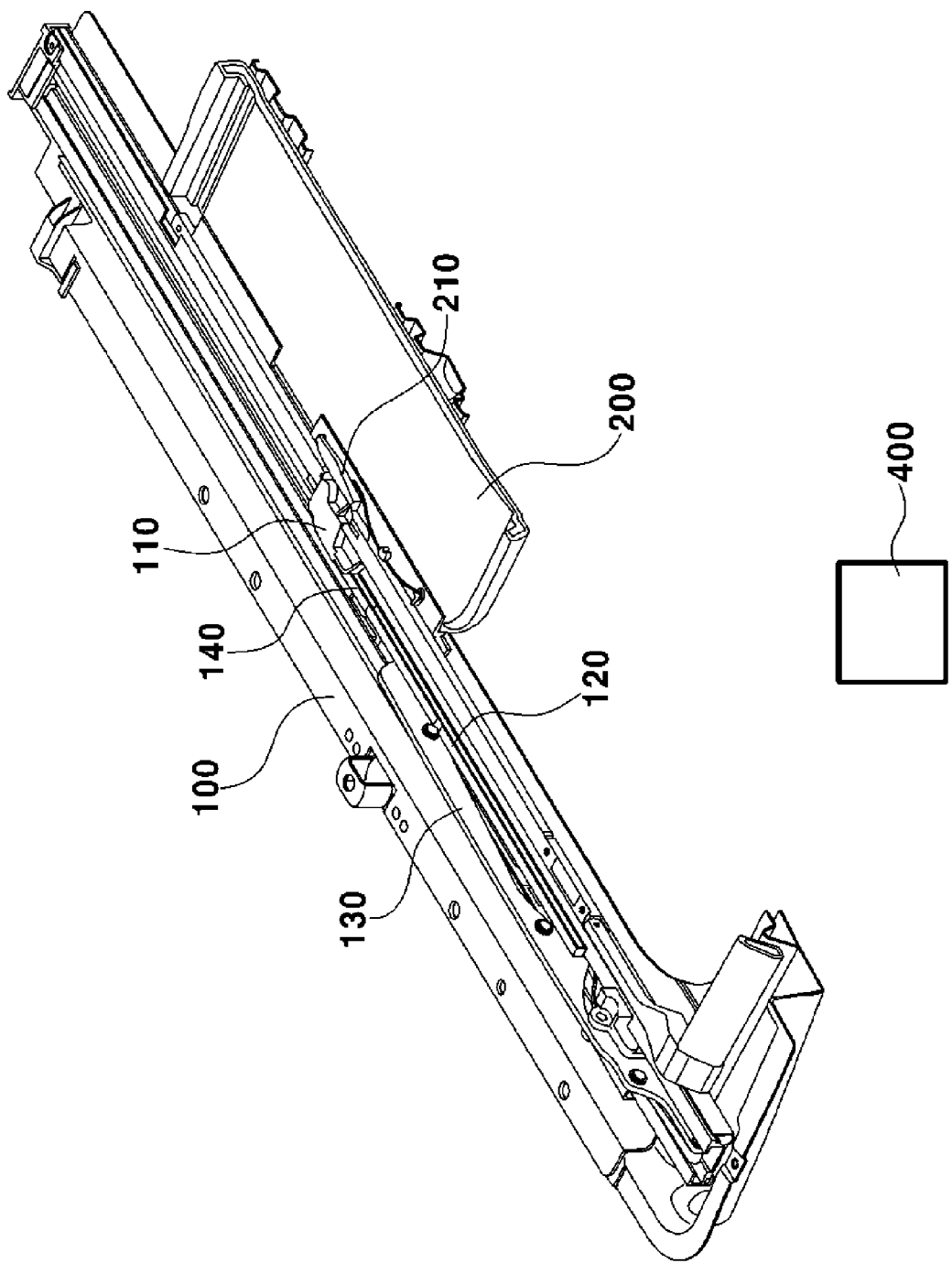
FIGS. 3A and 3B are views illustrating an operation for opening a sunroof glass of the electric sunshade and sunroof structure according to the exemplary embodiment of the present invention.
Figure 3B:
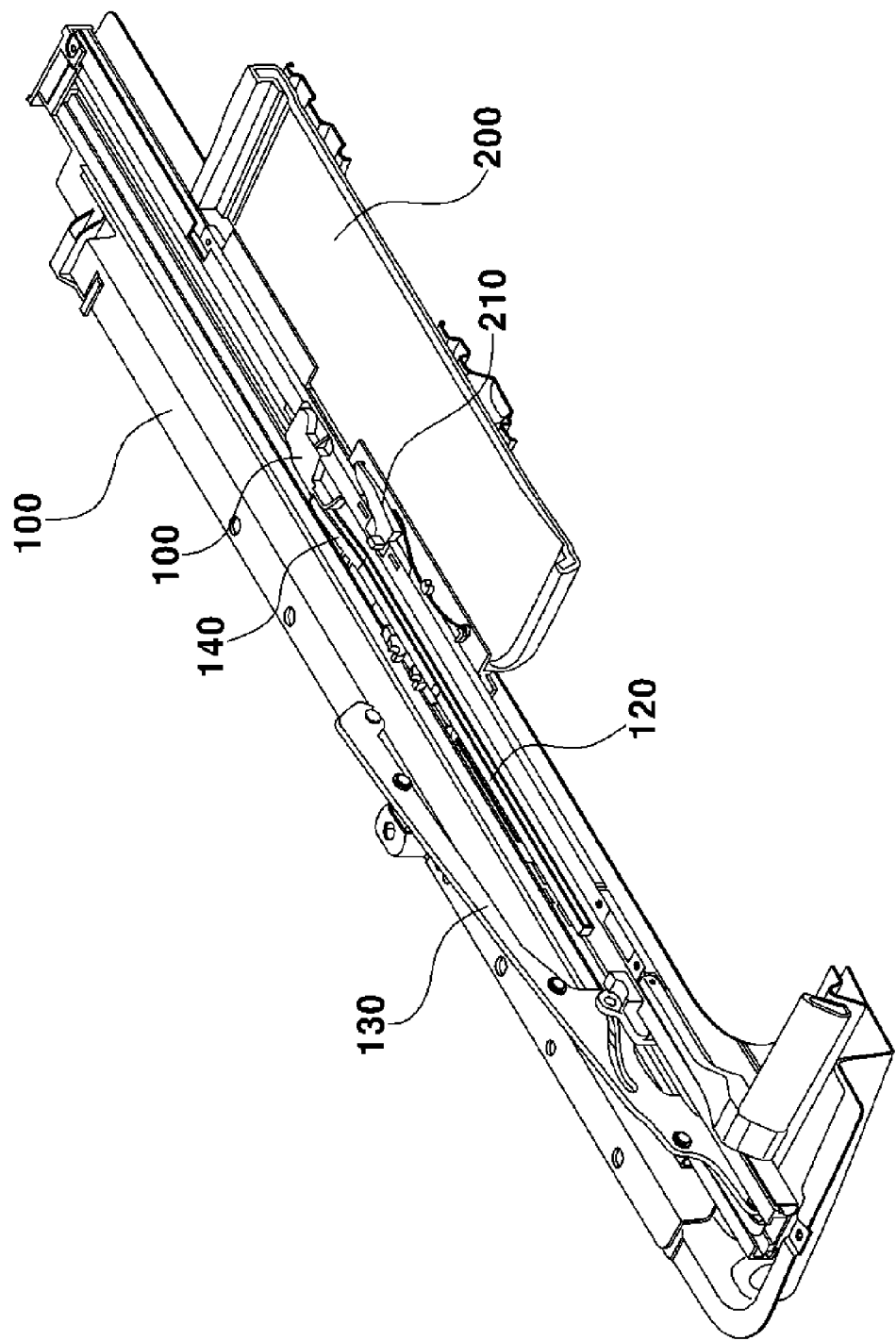

FIGS. 3A and 3B are views illustrating an operation for opening the sunroof glass 300 through the electric sunshade and sunroof structure according to the exemplary embodiment of the present invention.

The cable assembly 110 is coupled with the sunshade guide lever 210 until it is coupled with the guide slide lever 140, and moves along the guide slide assembly 120, thus opening the sunshade 200.

After the sunshade 200 has been opened, the cable assembly 110 is released from the sunshade guide lever 210, and is sequentially coupled with the guide slide lever 140.

After the cable assembly 110 is coupled with the guide slide lever 140, the cable assembly 110 is moved to the rear of the vehicle by the driving force of the motor 400, so that the guide slide lever 140 is moved simultaneously with the cable assembly 110.

The guide slide lever 140 is integrated with the guide slide assembly 120, so that the guide slide assembly 120 is moved in the moving direction of the cable assembly 110.

Before the guide slide lever 140 is coupled with the cable assembly 110, an end portion of an insertion guide slide lever 140 is fixedly inserted into an insertion groove 142 located inside the rail 100. That is, an insertion portion 141 located at an end portion of the guide slide lever 140 is fixedly inserted into the insertion groove 142 located on the rail 100, and the cable assembly 110 moves along a side groove which is formed along the insertion portion 141.

The groove 121 is integrally formed in the guide slide lever 140 and the guide slide assembly 120. The groove 121 may be formed to have a predetermined gradient along the insertion portion 141 of the guide slide lever 140 or to have a predetermined curvature along the insertion portion 141 of the guide slide lever 140.

Furthermore, the guide slide lever 140 is hinged to the guide slide assembly 120, thus allowing the guide slide lever 140 to move in a height direction of the vehicle by a predetermined height.

Therefore, when a protrusion of the cable assembly 110 moves along the groove 121 of the guide slide lever 140 to the rear of the vehicle, the guide slide lever 140 moves in the height direction of the vehicle, and then is separated from the insertion groove 142.

When the guide slide lever 140 is separated from the insertion groove 142 and is moved to the rear of the vehicle along with the cable assembly 110, the sunroof glass 300 integrated with the guide slide assembly 120 is opened.

Figure 4:
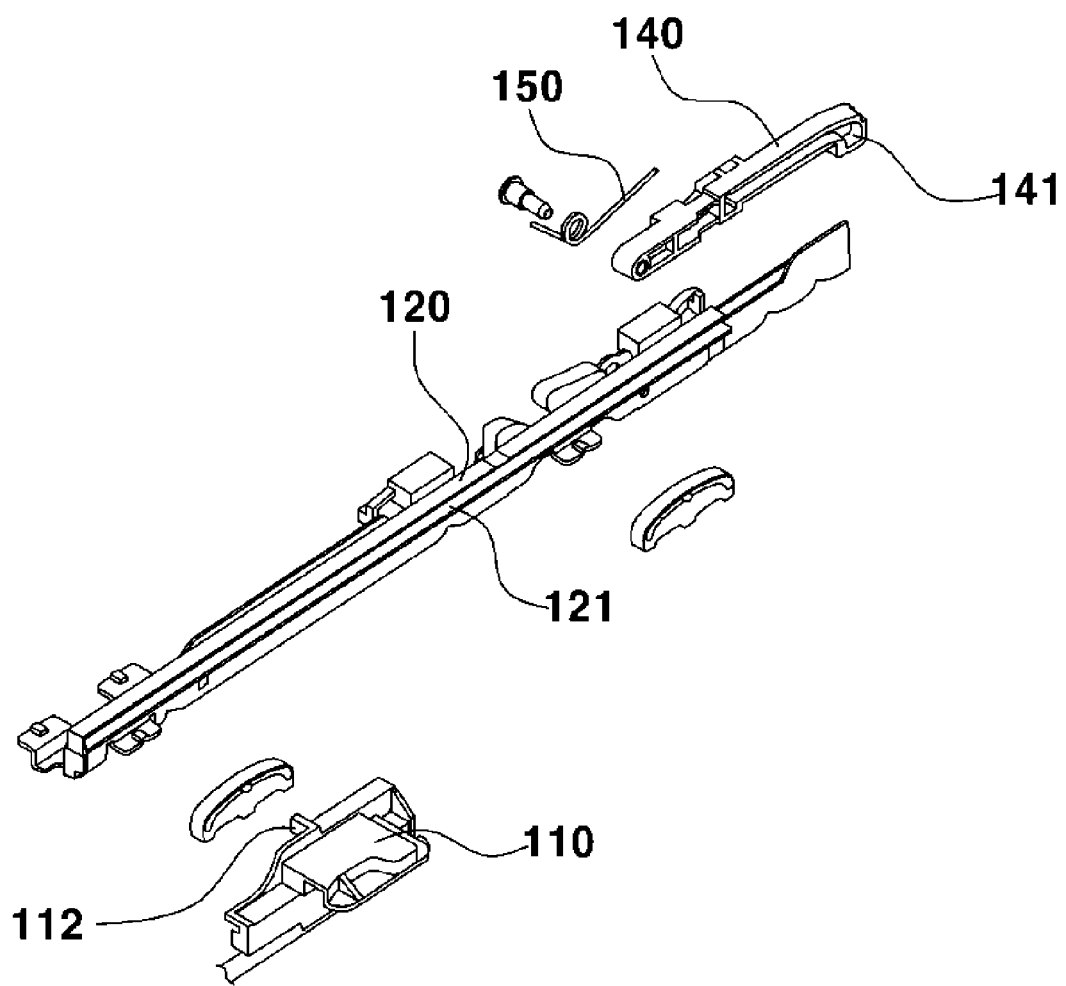
FIG. 4 is a view illustrating a configuration of a rail of the electric sunshade and sunroof structure according to the exemplary embodiment of the present invention.

FIG. 4 is an exploded view illustrating the configuration located at both sides of the roof panel of the vehicle, according to the exemplary embodiment of the present invention.

According to an exemplary embodiment of the present invention, the guide slide assembly 120 disposed on the roof panel rail 100 is included, and the guide slide assembly 120 is coupled with a tilt lever on the front of the vehicle. The guide slide assembly 120 has on the other end portion a guide slide elastic member 150 which is hinged to the guide slide lever 140 and provides a predetermined force in a direction where the guide slide lever 140 is fixedly inserted into the insertion groove 142. The insertion portion 141 located at one end portion of the guide slide lever 140 is fixedly inserted into the insertion groove 142 disposed on the rail.

Furthermore, tilt levers 130 are provided on both end portions of the sunroof glass 300 to be movable up and down, with a tilt groove 132 located in each tilt lever. A tilt protrusion 131 is formed to move integrally with the guide slide lever 140 and thus move along the tilt groove 132. When the guide slide lever 140 moves to the rear of the vehicle, the tilt protrusion 131 moves along the tilt groove 132 and moves the tilt lever 130 upwards, thus tilting up the sunroof glass 300.

According to the exemplary embodiment of the present invention, the electric sunshade and sunroof structure including the external sunroof may first perform the tilt-up operation of the sunroof glass 300, and may move the sunroof glass 300 to the rear of the vehicle, thus opening the sunroof.

Therefore, when the guide slide lever 140 moves integrally with the cable assembly 110, the tilt-up operation may be simultaneously or previously performed. The opening and tilt-up operations of the sunroof glass 300 may be simultaneously or sequentially performed, without being limited to the above-described sequence.

Figure 5:
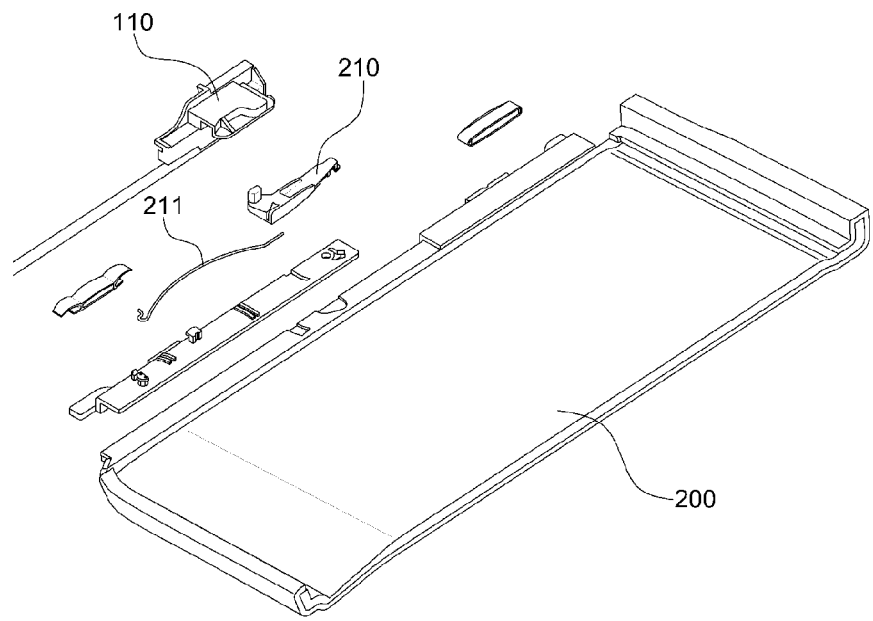
FIG. 5 is a view illustrating a configuration of the sunshade of the electric sunshade and sunroof structure according to the exemplary embodiment of the present invention.

FIG. 5 is an exploded view illustrating the configuration located at the sunshade 200 according to an exemplary embodiment of the present invention.

As illustrated in FIG. 5, there are provided a cable assembly 110 connected to one motor 400 via a cable, a sunshade guide lever 210 fixed to the sunshade 200, and a sunshade elastic member 211 connected to the sunshade guide lever 210 to provide a predetermined tension in a direction where it is coupled with the cable assembly 110.

According to an exemplary embodiment of the present invention, the sunshade guide levers 210 are provided on both sides of the sunshade 200. The sunshade guide lever 210 is coupled with the cable assembly 110 to move to the front and rear of the vehicle. Furthermore, the sunshade elastic member 211 may be included to provide a predetermined tension towards the sunshade 200. This may be configured to provide a force for releasing the cable assembly 110 from the sunshade guide lever 210. The sunshade elastic member 211 is included to provide a predetermined tension in the opposite direction of the curvature of the groove 111 located inside the cable assembly 110 after the sunshade 200 has been opened; when the sunshade is fully open, the sunshade guide lever 210 is configured to be released from the open end of the groove 111 by the elastic member 211. Preferably, after sunshade has been opened, the sunshade guide lever 210 is configured to be inserted and fixed from outside of the vehicle; thus the cable assembly 110 is released from the sunshade guide lever 210.

Another exemplary embodiment of the present invention may include the sunshade elastic member 211 which is connected to the sunshade guide lever 210 to provide a predetermined tension in a direction in which it is coupled with the cable assembly 110, thus providing a force for fastening the sunshade guide lever 210 to the cable assembly 110.

Figure 6:
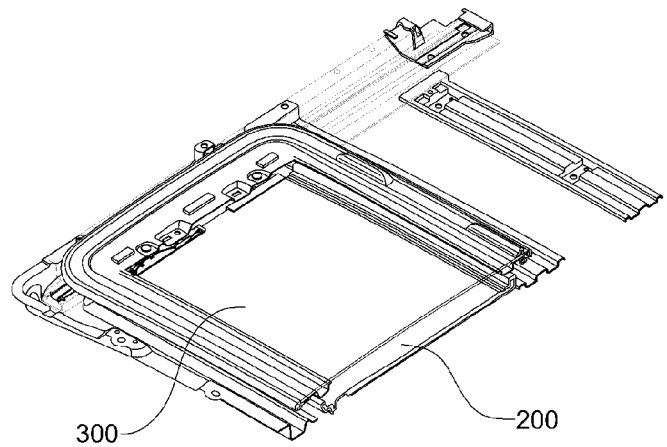
FIG. 6 is a view illustrating a state in which the electric sunshade and the sunroof are closed, according to the exemplary embodiment of the present invention.
Figure 6:
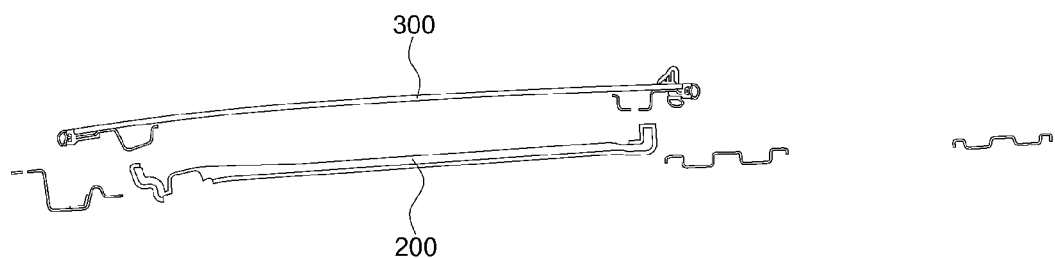
Figure 7:
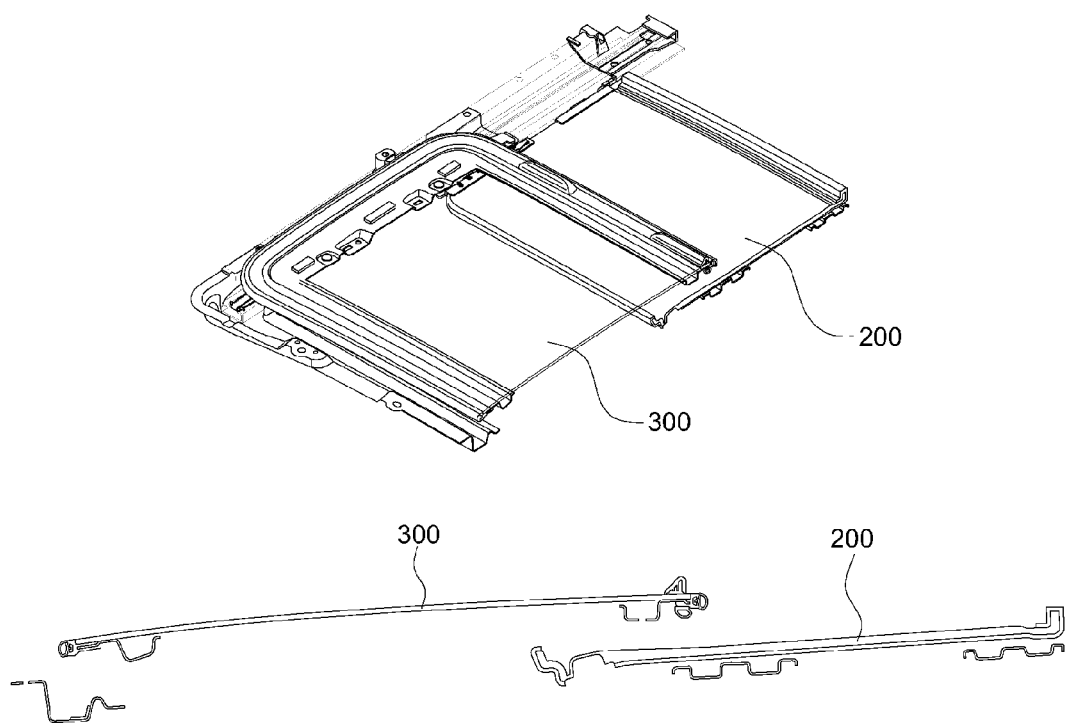
FIG. 7 is a view illustrating a state in which the electric sunshade is opened and the sunroof is closed, according to the exemplary embodiment of the present invention.
Figure 8:
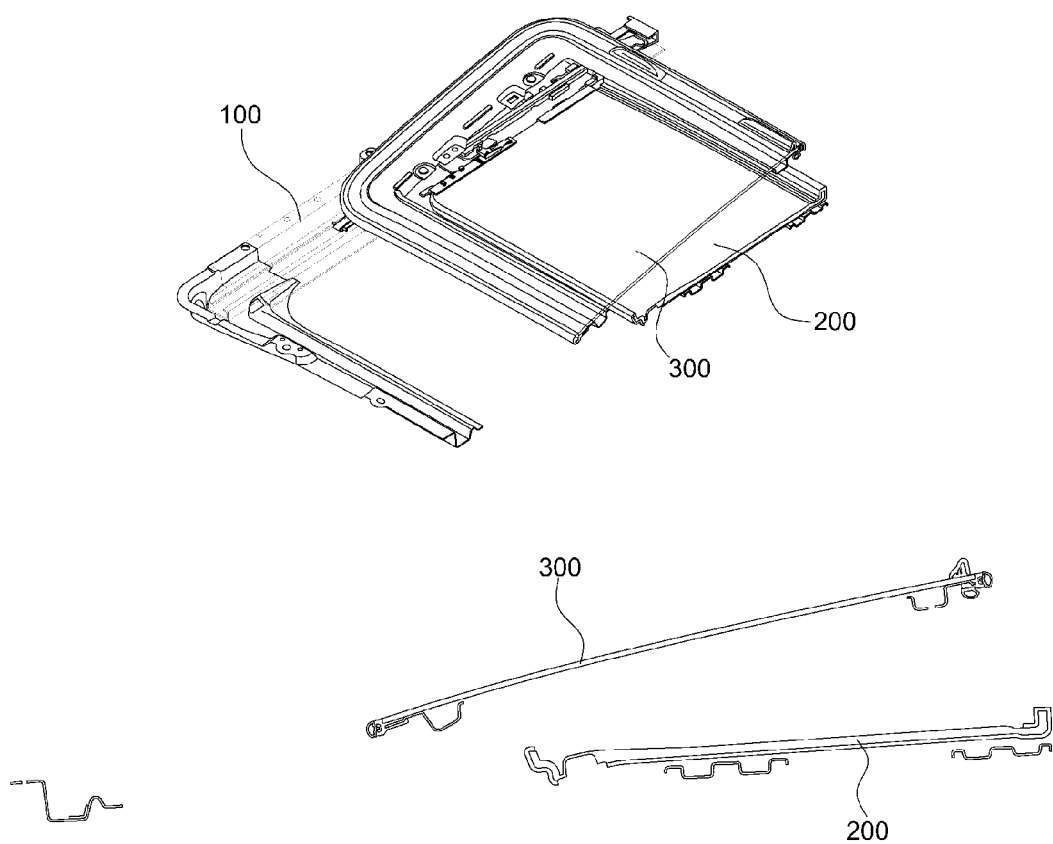
FIG. 8 is a view illustrating a state in which both the electric sunshade and the sunroof are opened, according to the exemplary embodiment of the present invention.

FIG. 6, FIG. 7, and FIG. 8 are views illustrating the operation of the present invention. FIG. 6, FIG. 7, and FIG. 8 sequentially illustrate the process of opening the sunshade 200 and the sunroof glass 300.

FIG. 6 illustrates a state in which the sunroof glass 300 and the sunshade 200 are closed. The cable assembly 110 is located at an end portion of a front of the sunroof.

FIG. 7 illustrates a state in which the sunshade 200 is opened. The cable assembly 110 is fastened to the sunshade guide lever 210 to move along the groove 121 of the guide slide assembly 120 and the guide slide lever 140 to the rear of the vehicle.

The sunshade guide lever 210 and the cable assembly 110 are configured to be released from each other in a state where the sunshade 200 is completely opened. A configuration for releasing the sunshade guide lever 210 from the cable assembly 110 will be described below with reference to FIG. 9 and FIG. 10.

FIG. 8 illustrates a state in which the sunroof glass 300 is opened. That is, after the sunshade 200 is completely opened, the cable assembly 110 is released from the sunshade guide lever 210 and then is fastened to the guide slide lever 140.

An exemplary embodiment of the present invention includes the insertion portion 141 located at an end portion of the guide slide lever 140. The insertion portion 141 is inserted into the insertion groove 142 formed in the rail 100 to maintain a fixed state.

Since the protrusion 112 of the cable assembly 110 moves along the groove 121 of the guide slide lever 140, the insertion portion 141 is separated from the insertion groove 142 and the cable assembly 110 and the guide slide lever 140 are integrally moved to the rear of the vehicle.

Moreover, since the guide slide assembly 120 connected to the guide slide lever 140 moves to the rear of the vehicle, the sunroof glass 300 fixed to the guide slide assembly 120 is opened.

On the other hand, an operation for closing the sunshade 200 and the sunroof glass 300 will be described below.

After the cable assembly 110 moves to the front of the vehicle, it is moved to close the sunshade 200.

That is, the cable assembly 110 is configured to move to the guide slide lever 140 to the front of the vehicle and then close the sunroof glass 300. Furthermore, a predetermined tension is applied to an end portion of the guide slide lever 140 along the rail by the guide slide elastic member 150. Thus, the insertion portion 141 of the guide slide lever 140 is fixedly fitted into the insertion groove 142 of the rail 100.

Subsequently, the cable assembly 110 is fastened to the sunshade guide lever 210 and then moved along with the guide slide assembly 120 integrally with the sunshade guide lever 210, thus closing the sunshade 200. As the cable assembly 110 moves to the front of the vehicle, the sunshade guide level 210 is inserted into the open front end of the groove 111 with the protrusion 212 of the sunshade being located at the other end of the groove; thus the cable assembly and the sunshade guide level 210 are integrally moved to the front of the vehicle.

Therefore, the electric sunshade and sunroof structure of the present invention is configured to sequentially open or close the sunshade 200 and the sunroof glass 300.

Figure 9:
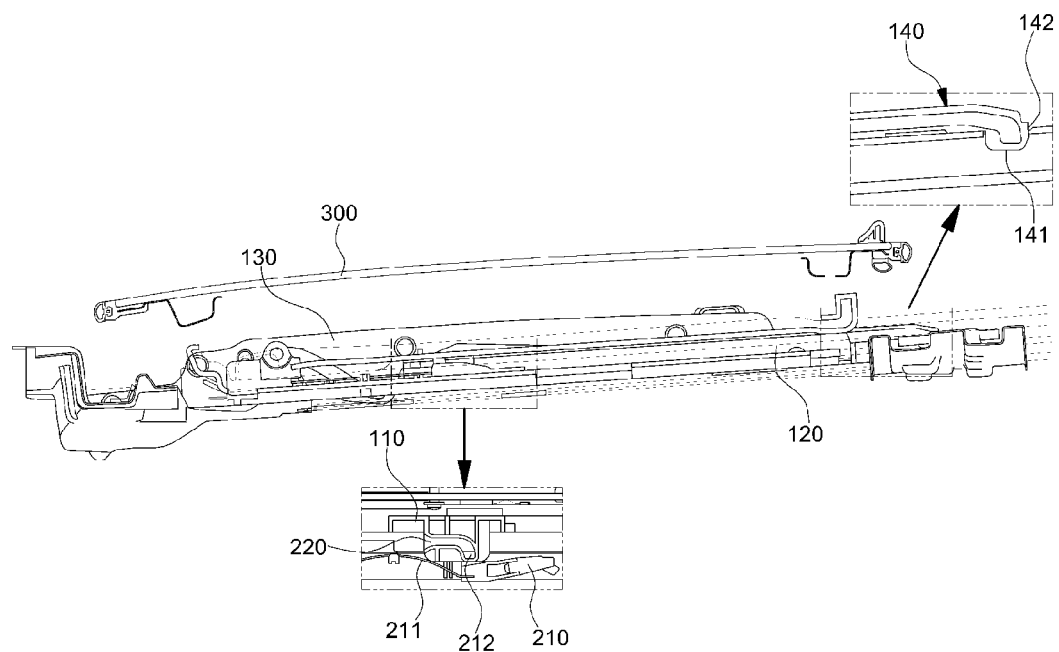
FIG. 9 is a side sectional view illustrating a configuration for opening the sunshade, according to the exemplary embodiment of the present invention.

FIG. 9 is a side sectional view illustrating the electric sunshade and sunroof structure in a state where the sunshade 200 is closed, according to the exemplary embodiment of the present invention.

Since the cable assembly 110 moves along the guide slide assembly 120, the cable assembly is fastened to the sunshade guide lever 210 and then is moved. The guide slide lever 140 located at an end portion of the rear of the guide slide assembly 120 is fixed to the insertion groove 142 formed in the rail 100 while the cable assembly 110 moves along the guide slide assembly 120. The guide slide lever 140 further includes at an end portion thereof the insertion portion 141 protruding towards the rail 100. Thus, the insertion portion 141 may be configured to be fixed to the insertion groove 142 formed in the rail 100.

The cable assembly 110 is configured to move along the groove 121 formed on a side of the guide slide assembly 120 to the front and rear of the vehicle, thus opening the sunshade 200.

When the sunshade 200 is opened, the guide slide lever 140 is fixed, and the cable assembly 110 is fastened to the sunshade guide lever 210 and then is moved.

Furthermore, a groove 111 is formed in the cable assembly 110, wherein the front end of the groove 111 is open and the rear end is closed so that the overall structure from the front to the rear end takes a curve form towards the inside of the vehicle. The protrusion 212 of the sunshade guide level 210 is located at the rear end of the groove 111, thus movable to the rear of the vehicle integrally with the cable assembly 110.

The protrusion 212 is configured, with a constant tension toward outside of the vehicle by the elastic member 211, to move to the open end along the curved form of the groove 111 when the sunshade 200 has been opened, thus releasing the cable assembly 110 from the guide level 210.

Preferably, after the sunshade 200 has been fully opened, the rail 100 includes a dent so that one end of the sunshade guide lever 210 including the protrusion 212 moves towards outside of the vehicle. The dent is configured so that one end of the sunshade guide lever 210 with its protrusion 212 rotates therein, thus releasing the sunshade guide lever 210 from the cable assembly 110 along the curved form of the groove 111 and to the open end thereof.

Figure 10:
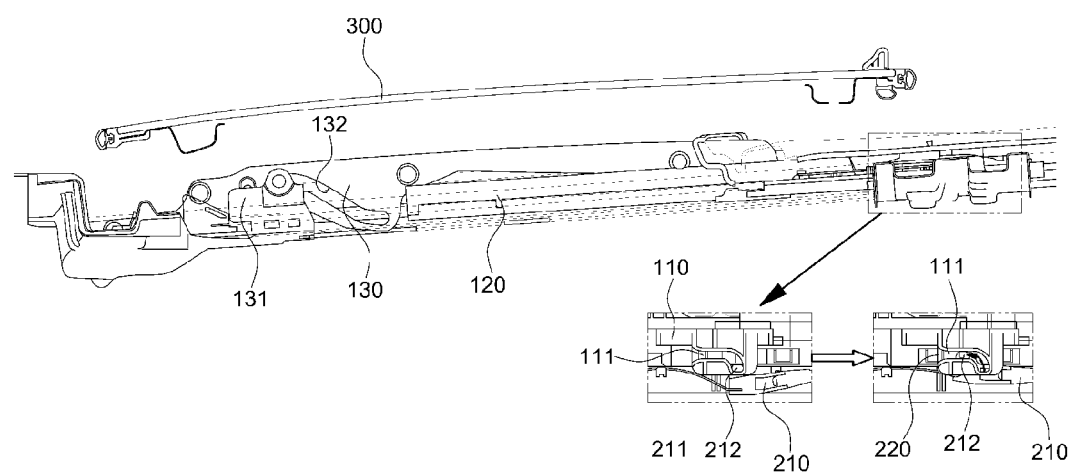
FIG. 10 is a view illustrating a configuration for opening the sunroof glass, according to the exemplary embodiment of the present invention.

FIG. 10 illustrates a coupling relationship for opening the sunroof glass 300 after the sunshade 200 is opened, according to the exemplary embodiment of the present invention.

When the sunshade guide lever 210 moves along the cable assembly 110 and the sunshade 200 is completely opened, the cable assembly 110 is released from the sunshade guide lever 210. Preferably, since the groove 111 formed in the cable assembly 110 is included, the protrusion 212 of the sunshade guide lever 210 moves along the groove 111.

A sunshade guide portion 220 performs a guide are configured to move the protrusion 212 provided on the sunshade guide lever 210 along the groove 111 formed in the cable assembly 110.

As illustrated in the drawing, after the sunshade 200 is completely opened, the protrusion 212 of the sunshade guide lever 210 is configured to move along the groove 111 by the sunshade guide portion 220, thus releasing the cable assembly 110 from the sunshade guide lever 210.

Subsequently, the cable assembly 110 moves along the grove 121 which is formed along the insertion portion 141 of the guide slide lever 140, thus releasing the guide slide lever 140 and moving to the rear of the vehicle integrally with the guide slide lever.

The guide slide lever 140 is configured to move integrally with the guide slide assembly 120 and to move the tilt protrusion 131 which is located in the guide slide assembly 120 to move inside the tilt lever 130, thus performing the tilt-up function of the sunroof.

The sunshade elastic member 211 provides a predetermined tension to the released protrusion. Thus, when the cable assembly 110 is moved to close the sunshade 200, the sunshade guide lever 210 is coupled with the cable assembly 110.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electric sunshade and sunroof structure comprising:
    a cable assembly connected to a drive motor via a cable, sliding longitudinally along each of guide slide assemblies disposed on rails provided on a first side and a second side of a roof panel of a vehicle, thus opening or closing a sunshade, and moving integrally with each guide slide assembly to open a sunroof glass;
    a sunshade guide lever provided on the sunshade, and selectively coupled with the cable assembly to move the sunshade; and
    a guide slide lever provided on a rear end portion of each guide slide assembly, and selectively coupled with the cable assembly to move the sunroof glass,
    wherein the cable assembly is fastened to the sunshade guide lever to open the sunshade, and is released from the sunshade guide lever and then is fastened to the guide slide lever to open the sunroof glass.

2. The electric sunshade and sunroof structure as set forth in claim 1, further including:
    a tilt lever provided on each of opposite end portions of the sunroof glass, and including a tilt groove to be movable upwards and downwards; and
    a tilt protrusion moving integrally with the guide slide lever to be movable along the tilt groove,
    wherein, when the guide slide lever moves toward a rear of the vehicle, the tilt protrusion moves the tilt lever upwards, thus tilting up the sunroof glass.

3. The electric sunshade and sunroof structure as set forth in claim 1, wherein the guide slide lever includes at an end portion thereof an insertion portion, and
    the insertion portion is fixedly inserted into the rail until the insertion portion is fastened to the cable assembly.

4. The electric sunshade and sunroof structure as set forth in claim 1, further including:
    a guide slide elastic member connected to the guide slide lever and providing a predetermined tension in a direction where the guide slide lever is fixed.

5. The electric sunshade and sunroof structure as set forth in claim 1, further including:
    a sunshade guide portion provided on the sunshade guide lever to release the sunshade guide lever from the cable assembly.

6. The electric sunshade and sunroof structure as set forth in claim 1, further including:
    a sunshade elastic member connected to the sunshade guide lever and providing a predetermined tension in a direction where the sunshade elastic member is coupled with the cable assembly.

7. The electric sunshade and sunroof structure as set forth in claim 1, wherein a protrusion provided on the sunshade guide lever moves along a groove provided on the cable assembly to release the sunshade guide lever from the cable assembly.

8. The electric sunshade and sunroof structure as set forth in claim 1, wherein a protrusion of the cable assembly is configured to move along a groove provided on a side of each guide slide assembly.

9. The electric sunshade and sunroof structure as set forth in claim 1, wherein, after the cable assembly is moved to close the sunroof glass, the cable assembly is moved to close the sunshade.

10. The electric sunshade and sunroof structure as set forth in claim 9, wherein the cable assembly moves the guide slide lever to a front of the vehicle to close the sunroof glass, and, after the cable assembly is released from the guide slide lever, the cable assembly is fastened to the sunshade guide lever and moves along each guide slide assembly to close the sunshade.

* * * * *